Oct. 7, 1947.  H. E. DRENNAN  2,428,516
PROCESS OF SEPARATING ISOBUTYLENE FROM ADMIXTURE
OF BUTENE-1 AND ISOBUTYLENE
Filed Sept. 24, 1942
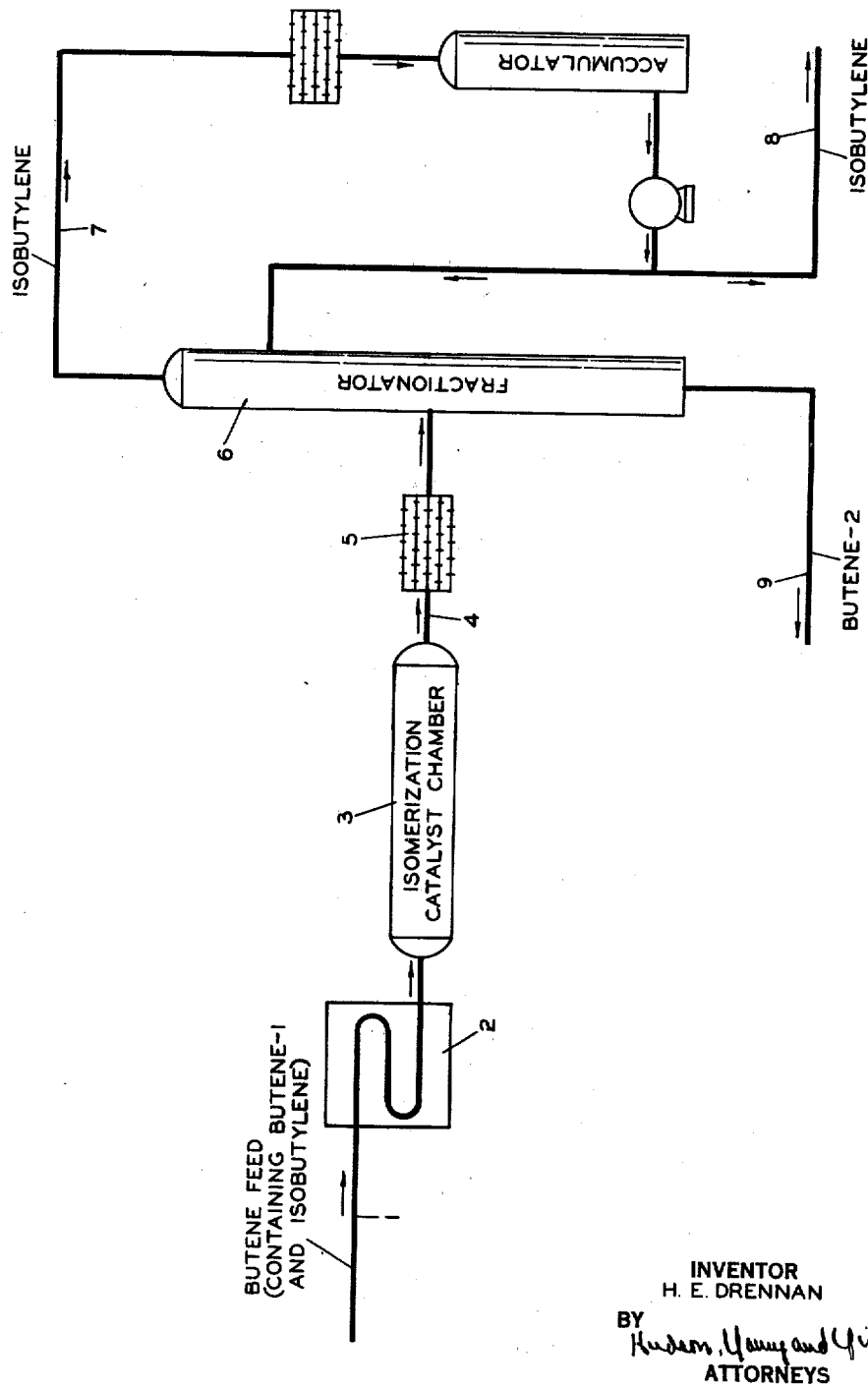
INVENTOR
H. E. DRENNAN
BY
ATTORNEYS Patented Oct. 7, 1947

2,428,516

UNITED STATES PATENT OFFICE 2,428,516

PROCESS OF SEPARATING ISOBUTYLENE FROM ADMIXTURE OF BUTENE-1 AND ISOBUTYLENE

Harry E. Drennan, Bartlesville, Okla., assignor to Phillips Petroleum Company, a corporation of Delaware Application September 24, 1942, Serial No. 459,589

2 Claims. (Cl. 260—677)

This invention relates to treatment of hydrocarbon mixtures containing either butene-1 and isobutylene or pentene-1 and isopentene (2-methyl-butene-1, sometime designated as unsymmetrical methylethylethylene) in order to separate the isoolefin content of the mixture in a form essentially free from the 1-olefin.

This application is a continuation-in-part of my prior and copending applications Serial Nos. 358,734, filed September 27, 1940, now Patent No. 2,361,612, issued October 31, 1944, 359,159 filed September 30, 1940, and 359,967, filed October 5, 1940, the latter now Patent No. 2,298,931, issued October 13, 1942.

In various hydrocarbon conversion processes, particularly cracking, dehydrogenation, reforming, etc. there are produced hydrocarbon mixtures of various compositions containing both saturated and unsaturated hydrocarbons. Many of the components of such mixtures are particularly valuable, provided they can be concentrated without too great an expense, for use either as such in the form in which they occur in the mixture or for use in the synthesis of other hydrocarbons. However in many cases it is difficult to concentrate the desired components of such a mixture by the usual distillation methods without expensive special equipment. Frequently separation by fractional distillation is wholly impossible because of the closeness of the boiling points, the formation of azeotropes, etc. Accordingly it is frequently necessary to resort to expensive and complex solvent extraction, azeotropic distillation, or chemical separation methods.

For example, the dehydrogenation of a mixture consisting primarily of butanes will give butene-1, butene-2, isobutylene, etc. Isobutylene is particularly valuable for use in the manufacture of synthetic resins and rubber and in the synthesis of isooctane. Butene-1 and its isomer butene-2 are valuable for use in the production of various organic compounds, one of these being butadiene which is used in the manufacture of synthetic rubber. However the butenes must be individually isolated from the mixture in which they occur in order to be used for the purposes mentioned. The usual procedure is to concentrate the butenes and then isolate the individual butenes from the concentrate. The concentrate is easily prepared by fractional distillation, and butene-2 is easily separated from the concentrate by the same method, but the separation of butene-1 and isobutylene by fractional distillation is difficult and expensive because of their nearly equal volatility characteristics. The boiling points of isobutylene and butene-1 are —6.6° C. and —6.1° C. respectively.

Similarly the separation of pentene-1 from isopentene by fractional distillation is difficult since their boiling points are 30.2° C. and 31.1° C. respectively. Whereas the boiling points of isobutylene and butene-1 are separated by only one-half of a degree centigrade, pentene-1 and isopentene differ by 0.9° C. While the separation of pentene-1 and isopentene may be somewhat less difficult and less commercially important at the present time, nevertheless the problem is sufficiently important to make a simple solution of considerable value since these pentenes are valuable chemical intermediates and starting materials for example in the preparation of piperylene and isoprene which are employed in the manufacture of synthetic rubber.

The principal object of the present invention is to provide an improved process for the separation of $C_4$ or $C_5$ isoolefins from the corresponding 1-olefins. Another object is to provide such a process for the separation of isobutylene from butene-1. Another object is to provide such a process for the separation of isopentene from pentene-1. Another object is to provide a process accomplishing the foregoing objects which does not employ azeotropic distillation, solvent extraction methods of separation, or separations dependent upon formation of a complex or addition compound of an extraneous chemical which reacts with one of the components sought to be separated. Numerous other objects will more fully hereinafter appear.

The invention may be more easily understood by reference to the accompanying drawing which portrays diagrammatically one arrangement of apparatus that has been found suitable for carrying out the process of the present invention.

I have discovered that isobutylene may be separated in a very satisfactory, less expensive way from hydrocarbon mixtures containing the same and butene-1, by subjecting the mixture to treatment to isomerize the butene-1 to its less volatile isomer butene-2 which permits the ready recovery by fractional distillation of isobutylene as an overhead product and butene-2 as a kettle product.

The isomerization of the butene-1 to butene-2 may be effected in any suitable manner, for example, by the method of Runge 1,914,674. However it is preferred to use low temperature methods examples of which are set forth in my copending applications above-identified. Thus in my application Serial No. 358,734 (Patent No. 2,361,612) the isomerization is conducted in the vapor phase at above 200° F. over a catalyst comprising a porous carrier impregnated with a mixture of phosphorus pentoxide and a high melting point tar and heated to carbonization temperature before use. In Serial No. 359,159 (Patent No. 2,330,115) the isomerization is carried out at above 150° F. by means of bauxite treated with sulfuric or phosphoric acid. In Serial No. 359,967 (Patent No. 2,298,931) the isomerization is effected at above 150° F. with a solid catalyst made by reacting copper oxide with sulfuric or phosphoric acid. Any of these methods may be used. Instead of the foregoing methods, any other methods may be employed which effect isomerization of the 1-olefin to the 2-olefin without substantially affecting the isoolefin or any other hydrocarbons present. Examples of such other methods are those shown in copending application of Hillyer and Schulze Serial No. 359,948, filed October 5, 1940, which is directed to isomerization at 200 to 600° F. over an adsorbent carrier such as silica gel impregnated with sulfuric or phosphoric acid, Hillyer Serial No. 372,921, filed January 2, 1941, Patent No. 2,387,994 and drawn to isomerization over an inert carrier impregnated with sulfuric or phosphoric acid, the olefin feed carrying water vapor, Matuszak Serial No. 441,705, filed May 4, 1942 (Patent No. 2,403,671), on isomerization over black chromium oxide, my application Serial No. 446,771, filed June 12, 1942, Patent No. 2,361,613, on isomerization with anhydrous magnesium oxide, and my application Serial No. 450,797, filed July 13, 1942 (Patent No. 2,353,552), on effecting the isomerization of anhyrous 1-olefins to 2-olefins over a solid catalyst which has previously been heated to a temperature above the isomerization temperature to free it from water and undesirable gases.

I prefer to use such an isomerization process and conditions that at least 90 per cent of the normal butenes in the isomerization feed appear as butene-2 in the isomerization effluent. I also prefer to so carry out the isomerization that this isomerization reaction is substantially the sole reaction taking place and that virtually no other reactions occur, so that the isobutylene and other components of the feed are unaffected and so that essentially no polymerization, cracking, etc., take place.

I prefer to carry out the isomerization by passing the hydrocarbons over calcined brucite at temperatures ranging from 200 to 400° F. in the case of butenes and 200 to 600° F. in the case of pentenes.

Butene-1 and butene-2 can be reversibly isomerized under proper conditions of temperature and pressure and preferably in the presence of suitable catalysts. The equation for the reaction is as follows:

$$H_3C—CH_2CH=CH_2 \rightleftarrows H_3C—CH=CH—CH_3$$

at comparatively low temperatures, namely 100° C. (212° F.) and lower, this reaction tends to reach equilibrium at about 90 to 95 per cent butene-2 and 5 to 10 per cent butene-1. Higher temperatures tend to shift the equilibrium towards butene-1 so that at about 400° C. (752° F.) the equilibrium is about 25 per cent butene-1 and 75 per cent butene-2. The boiling points of butenes-2 are 1.0° C. (38.8° F.) and 3.7° C. (38.7° F.) for the cis and trans forms respectively, both of which have substantially higher boiling points than either isobutylene or butene-1 so that the butenes-2 are readily separated by fractional distillation.

In the process of my invention, I take advantage of the fact that butene-1, which boils at nearly the same temperature as isobutylene, can be readily isomerized to butene-2 which boils at a substantially higher temperature than isobutylene. I apply an isomerization treatment to a hydrocarbon mixture containing isobutylene and butene-1 to convert most of the butene-1 to butene-2 in order to make possible the recovery of comparatively pure isobutylene and butene-2 by subjecting the isomerization effluent to fractional distillation. In most cases, I prefer to use calcined brucite (magnesium hydroxide) as the isomerization catalyst because it is readily available, inexpensive and will give conversion yields of butene-1 to butene-2 up to 90 per cent and better when used under proper conditions of temperature and pressure.

Referring to the drawing, a butylene concentrate containing substantial amounts of isobutylene and butene-1 is fed via line 1 and heater 2, which brings the feed to reaction temperature, to isomerization chamber 3 maintained at proper temperature and pressure for effecting isomerization of a major proportion or substantially all of the butene-1 to butene-2. The isomerization effluent is fed via line 4 and cooler 5 into fractionation system 6 which is operated at suitable temperature and pressure and has a sufficient number of plates to effect complete separation of isobutylene from butene-2. The isobutylene leaves overhead via line 7 and a suitable proportion of the condensate is returned to the tower 6 as reflux while the rest is drawn off as one product via line 8. The butene-2 is removed via line 9 from the bottom of the tower 6 as a kettle product.

If desired, either isobutylene or butene-2 of very high purity can be obtained. For example, if pure isobutylene is desired, the isobutylene fraction obtained by fractional distillation may be passed through another isomerization catalyst chamber containing calcined brucite. A large proportion of the residual butene-1 not converted in the first treatment will thus be converted to butene-2 which can be fractionated out as before. This may be repeated as many times as practical or until the desired purity of isobutylene is obtained. For example, assuming that a 50–50 mol mixture of butene-1 and isobutylene is to be treated, assuming 90 per cent conversion of butene-1 to butene-2 in passing the mixture through a calcined brucite catalyst, the residual butene-1 will be 10 per cent of the original or five mols. In other words, when this mixture is fractionated about 45 mols of butene-2 will be separated from the mixture leaving an isobutylene-butene-1 mixture of about 50 and 5 mols, respectively. Or the resultant isobutylene mixture contains about 9.1 per cent butene-1 impurity. Similarly this mixture can be treated to convert a large portion of the residual butene-1 to butene-2 and subsequently fractionated, and so on. The following tabulation gives an approximate indication of the purity of products obtained from a 50–50 mol mixture of isobutylene and butene-1 assuming 90 per cent conversion of butene-1 to butene-2 by treating with a calcined brucite catalyst and subsequent fractionation several times in succession.

| Treatment No. | Mol Ratio of Butene-1 to Isobutylene in Resulting Isobutylene Fraction | Mol Per Cent Butene-1 in Resulting Isobutylene Fraction |
|---|---|---|
| 1 (feed) | 5/50 | 9.1 |
| 2 (isobutylene fraction) | 0.5/50 | 0.91 |
| 3 (isobutylene fraction) | 0.05/50 | 0.091 |

Thus, theoretically, nearly 100 per cent pure isobutylene could be made if so desired. However, fractionation is not usually controlled that closely. Moreover in most cases it probably would not be practical to employ more than one or two treatments. Two treatments would leave a residual of about 1 per cent of butene-1 in the isobutylene, and it is likely that the fractionation would be so conducted that a small amount of butene-2 would be taken overhead with the isobutylene in order to insure that none of the isobutylene was being left in the kettle products. Consequently, in commercial operation the resultant isobutylene will be about 97 to 98 per cent pure when the feed and the first isobutylene fraction are treated and fractionated in succession as described.

As pointed out before, butene-2 of high purity can be obtained by the process of my invention. A pure butene-2 fraction can be recovered more readily than a pure isobutylene fraction, because its volatility is considerably less than either isobutylene or butene-1, which permits recovering butene-2 as a bottom product of a fractional distillation by simply taking the isobutylene and butene-1 off as an overhead fraction. However, in order to increase the yield of butene-2 as much as possible, it will probably be desirable to subject the mixture to the isomerization steps described in the recovery of isobutylene. In that case, a relatively pure isobutylene will be taken off as an overhead product and butene-2 will be taken off as a bottom product. If the butene concentrate fed to the process is practically all butenes, the butene-2 as recovered will be relatively pure. However, if heavy materials are present in the feed, another fractionation step will be required for their removal and the recovery of relatively pure butene-2.

Once butene-2 has been separated from the isobutylene, it may, if desired, be isomerized in known manner back to a mixture of butene-1 and butene-2 which in turn may be fractionated to recover butene-1.

The isomerization step may be conducted in either the vapor or liquid phase. However when the isomerization over calcined brucite is conducted in the vapor phase, there is the possibility that a certain amount of polymerization will occur in the catalyst chamber and the polymer, being a heavy and comparatively non-volatile product, may cover the catalyst and render it ineffective. Also, higher temperatures are generally used in vapor phase treatment than in liquid phase conversion, which are undesirable in that they shift the equilibrium for butene-1 and butene-2 towards butene-1 making 90 per cent or greater conversion impossible. In the liquid phase operation the temperature may be only 100° C. (212° F.) or less and the pressure need be only that required to keep the components in the liquid phase which in most cases will be about 200 pounds per square inch gage. Under these conditions, up to 90 per cent and better conversions of butene-1 to butene-2 are possible and any polymer formed tends to be dissolved and washed off of the catalyst and carried away by the liquid feed and conversion products as fast as it is formed. Any such polymer is retained in the kettle products of the subsequent distillation step or steps.

It will be understood that the feed mixture need not be a butylene concentrate since the process of the invention can be equally well practiced on any mixed hydrocarbon feed of six or fewer carbon atoms per molecule and containing substantial quantities if isobutylene and butene-1. Other $C_4$ hydrocarbons may be present such as normal butane or isobutane, butadiene, vinylacetylene, etc. If the feed contains butene-2 in amount equal to or in excess of the equilibrium value for butene-1 and butene-2 in the isomerization step, it will be necessary of course to preliminarily fractionate to separate the butene-2. In fact wherever butene-2 is present in any substantial amounts in the feed it may be desirable to preliminarily remove all or substantially all of it in order that maximum conversion of butene-1 to butene-2 may be attained in the isomerization step.

While the foregoing discussion relates to separation of isobutylene from butene-1, it is equally applicable to separation of isopentene from pentene-1 by isomerizing the pentene-1 to pentene-2 which boils at 35.8 and 37.6° C., or, at the least 4.7° C. above isopentene and still further above pentene-1. Separation of pentene-1 from isopentene is frequently a matter of extreme importance and the present invention makes this separation possible without resort to expensive solvent extraction, chemical processes involving formation of addition compounds, or azeotropic distillation. It is therefore to be understood that the foregoing discussion, wherever the context permits, may be read with substitution of isopentene for isobutylene, pentene-1 for butene-1, and pentene-2 for butene-2.

*Example*

A synthetic mixture of isobutylene and butene-1 in the proportion of 50 mols of isobutylene and 50 mols of butene-1 was subjected to isomerization treatment by passage in liquid phase through a converter filled with calcined brucite and maintained at 100° C., the pressure being sufficiently high to keep the hydrocarbons in liquid phase throughout the conversion zone. The effluent consisted of isobutylene, butene-2 and butene-1 in the proportions of 50 mols, 45 mols, and 5 mols, respectively. This product was fractionated in an 80 plate column at a top temperature of about 120° F., a pressure of 85 pounds per square inch absolute, and a reflux ratio of nine to one based on the overhead. The overhead and kettle products analyzed as follows:

|  | Overhead | Kettle |
|---|---|---|
|  | Mol percent | Mol percent |
| Isobutylene | 89 | 4.5 |
| Butene-1 | 9 | 0.5 |
| Butene-2 | 2 | 95.0 |

An isomerization treatment on the overhead product and a subsequent fractionation under essentially the same conditions as before gave an isobutylene overhead product of between 96 and 97 mol per cent purity.

From the foregoing it will be seen that the process of my invention presents a great many advantages over previous methods of separating isobutylene from butene-1 or isopentene from pentene-1. Among these are that the separation is more economically and efficaciously effected, and a cleaner separation is attained, with none of the disadvantages attending separation by solvent extraction, chemical compound formation, azeotropic distillation and other previously proposed methods. Another advantage is that essentially pure isobutylene and butene-2 fractions are easily produced which is often desirable where isobutylene is to be used as a poly feed or an alkylation agent and where butene-2 is to be converted under optimum conditions to butadiene by dehydrogenation. Numerous other advantages will be apparent to those skilled in the art.

It will be obvious that many modifications other than those described in the foregoing may be practiced without departing from the spirit of this invention; consequently, the foregoing disclosure is not to be construed as limiting the invention which is to be taken as limited only by the terms and the spirit of the appended claims.

I claim:

1. The process of separating isobutylene from admixture with butene-1 which comprises passing a liquid mixture of butene-1 and isobutylene over calcined brucite as an isomerization catalyst in a reaction zone maintained at a temperature of from 200 to 400° F. and under a pressure sufficient to maintain liquid phase throughout the conversion zone and thereby effecting at least 90 per cent conversion of butene-1 to butene-2 as the principal reaction, polymerization occurring to a slight extent, removing the liquid conversion products from the reaction zone, thereby dissolving the polymer formed, washing same off the catalyst and carrying same away by the liquid feed and conversion products as fast as said polymer is formed, and fractionally distilling the conversion products to separate the butene-2 from the isobutylene.

2. The process of separating isobutylene from admixture with butene-1 which comprises passing a liquid mixture of butene-1 and isobutylene over calcined brucite as an isomerization catalyst in a reaction zone maintained at a temperature of 212° F. and under a pressure sufficient to maintain liquid phase throughout the conversion zone and thereby effecting at least 90 per cent conversion of butene-1 to butene-2 as the principal reaction, polymerization occurring to a slight extent, removing the liquid conversion products from the reaction zone, thereby dissolving the polymer form, washing same off the catalyst and carrying same away by the liquid feed and conversion products as fast as said polymer is formed, and fractionally distilling the conversion products to separate the butene-2 from the isobutylene.

HARRY E. DRENNAN.

REFERENCES CITED

The following references are of record in the file of this patent:

UNITED STATES PATENTS

| Number | Name | Date |
|---|---|---|
| 1,914,674 | Runge | June 20, 1933 |
| 2,199,133 | Marschner | Apr. 30, 1940 |
| 2,281,804 | Ruthruff | May 5, 1942 |
| 2,311,096 | Strawn | Feb. 16, 1943 |
| 2,282,231 | Mattox | May 5, 1942 |
| 2,388,510 | Voge | Nov. 6, 1945 |

Certificate of Correction

Patent No. 2,428,516. October 7, 1947.

HARRY E. DRENNAN

It is hereby certified that errors appear in the printed specification of the above numbered patent requiring correction as follows: Column 4, line 1, for "(38.8° F.)" read (*33.8° F.*); column 6, line 14, for "quantities if" read *quantities of*; column 8, line 19, for "form" read *formed*; and that the said Letters Patent should be read with these corrections therein that the same may conform to the record of the case in the Patent Office.

Signed and sealed this 27th day of January, A. D. 1948.

[SEAL]

THOMAS F. MURPHY,
*Assistant Commissioner of Patents.*